US011095170B1

(12) United States Patent
Wang

(10) Patent No.: US 11,095,170 B1
(45) Date of Patent: Aug. 17, 2021

(54) WIRELESS CHARGING

(71) Applicant: STMicroelectronics (Shenzhen) R&D Co. Ltd., Shenzhen (CN)

(72) Inventor: Jiasheng Wang, Shenzhen (CN)

(73) Assignee: STMICROELECTRONICS (SHENZHEN) R&D CO. LTD., Shenzhen (CN)

(*) Notice: Subject to any disclaimer, the term of this patent is extended or adjusted under 35 U.S.C. 154(b) by 0 days.

(21) Appl. No.: 16/931,111

(22) Filed: Jul. 16, 2020

(51) Int. Cl.
*H02J 50/80* (2016.01)
*H04B 5/00* (2006.01)
*H02J 7/00* (2006.01)
*H02J 50/12* (2016.01)
*H02J 50/40* (2016.01)
*H02M 3/156* (2006.01)

(52) U.S. Cl.
CPC .......... *H02J 50/80* (2016.02); *H02J 7/00032* (2020.01); *H02J 7/0047* (2013.01); *H02J 50/12* (2016.02); *H02J 50/40* (2016.02); *H02M 3/156* (2013.01); *H04B 5/0037* (2013.01)

(58) Field of Classification Search
CPC .. H02J 50/80; H02J 50/12; H02J 50/40; H02J 7/0032; H02J 7/0047; H02J 7/00; H02M 3/156; H04B 5/0037; H04B 6/00
See application file for complete search history.

(56) References Cited

U.S. PATENT DOCUMENTS

| 8,338,991 | B2 | 12/2012 | Von Novak et al. |
| 8,796,999 | B2 | 8/2014 | Toncich et al. |
| 9,130,407 | B2 | 9/2015 | Toncich et al. |
| 9,806,554 | B2 | 10/2017 | Lee et al. |
| 2019/0013728 | A1 | 1/2019 | Liu et al. |
| 2019/0386525 | A1 | 12/2019 | Smith et al. |

FOREIGN PATENT DOCUMENTS

WO 2015080517 A1 6/2015

OTHER PUBLICATIONS

Freescale Semiconductor Inc., Application Note, "Demodulating Communication Signals of Qi-Compliant Low-Power Wireless Charger Using MC56F8006 DSC," Document Number: AN4701, Rev. 0, Mar. 2013, 21 pages.
Maxim Integrated, "Let Your Smartphone Power Your Smartwatch-Wirelessly," www.maximintegrated.com/design-solutions, Design Solutions No. 49, Rev. 1, Oct. 2017, 4 pages.
STMICROELECTRONICS STWLC68, "Qi-compliant inductive wireless power receiver for 5W applications," Datasheet—Production data, DS13131—Rev 2, Apr. 2020, 33 pages.

*Primary Examiner* — Robert L Deberadinis
(74) *Attorney, Agent, or Firm* — Slater Matsil, LLP

(57) ABSTRACT

A system and method for improving ASK packet transfer reliability and power dissipation efficiency at light-load or no-load conditions of a receiving device is provided. In an embodiment, the receiving device includes a dissipating element coupled to a rectifier. The dissipating element is connected to a reference voltage at a first duration corresponding to a transmission of the ASK packet. The dissipating element is disconnected from the reference voltage a second duration corresponding to an end of the transmission of the ASK packet.

20 Claims, 4 Drawing Sheets

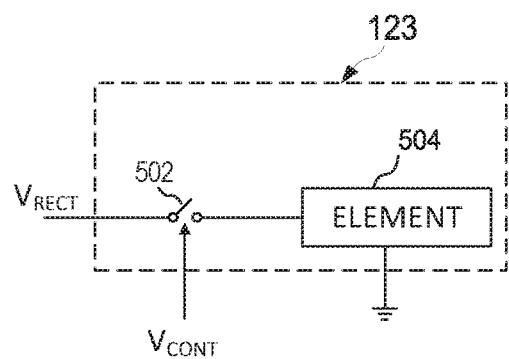
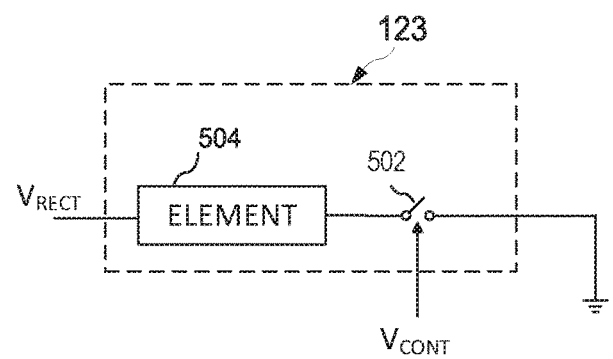
FIG. 5A          FIG. 5B
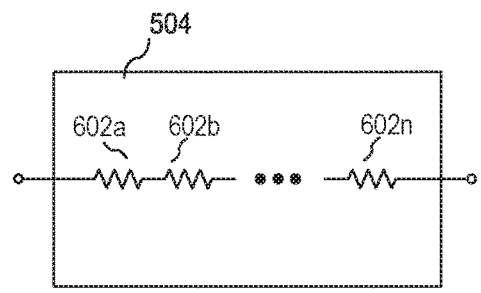
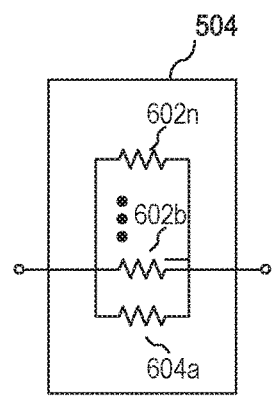
FIG. 6A          FIG. 6B
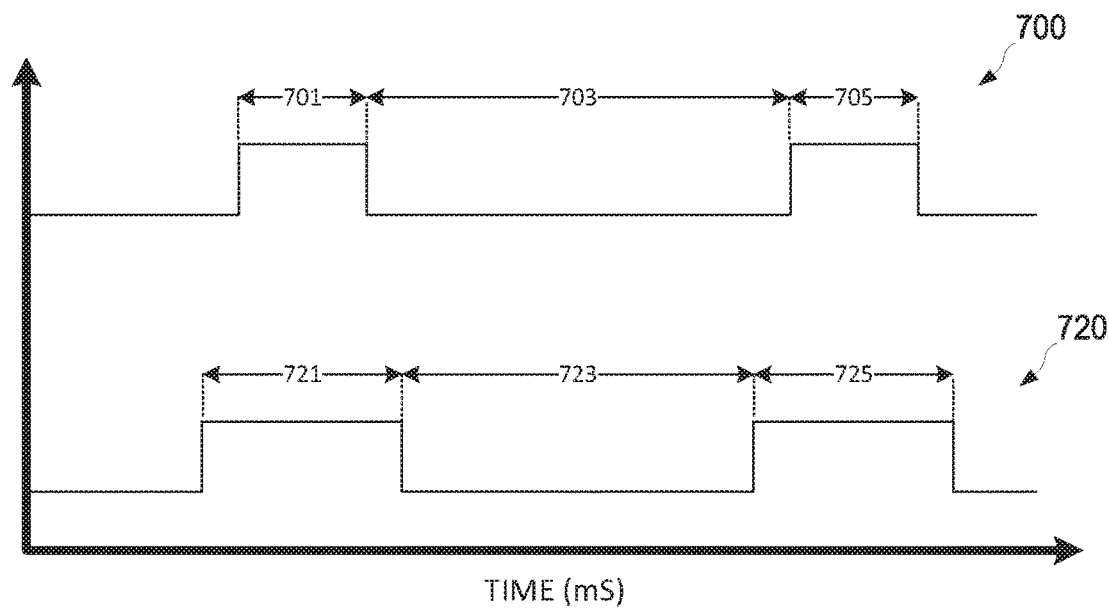
FIG. 7

WIRELESS CHARGING

TECHNICAL FIELD

The present disclosure relates generally to wireless charging, and, in particular embodiments, to communications by a receiving device using amplitude modulation.

BACKGROUND

Wireless power systems provide a method for wireless energy transfer between at least two devices. The transmitting device generates an electromagnetic field, and the receiving device receives the energy using inductive coupling. The receiving device stores the energy in a battery or consumes the power in a load.

Generally, a Qi-compatible wireless power system uses amplitude-shift keying (ASK) modulation to message information from the receiving device to the transmitting device. In particular, the message information is used to relay the receiving device condition to adjust power transfer parameters at the transmitting device. In ASK modulation, the receiving device transmits digital data by modulating the amplitude of the carrier wave.

A robust and reliable system and method for amplitude modulation in a wireless power system are therefore desired.

SUMMARY

A first aspect relates to a receiving device that includes a rectifier, a dissipating element, a transistor, a non-transitory memory, and a processor. The dissipating element is coupled to an output of the rectifier, and the transistor is coupled to the dissipating element. The non-transitory memory storage includes instructions, and the processor is in communication with the non-transitory memory storage and is coupled to the transistor. The processor executes the instructions to (1) electrically couple, by the transistor, the output of the rectifier through the dissipating element to a reference voltage for a first duration corresponding to a transmission of a packet by the receiving device, and (2) decouple, by the transistor, the output of the rectifier from the reference voltage for a second duration corresponding from an end of the transmission of the packet to a transmission of a next packet by the receiving device.

In a first implementation form of the receiving device according to the first aspect, the processor executes the instructions to determine that a light-load condition or a no-load condition is present at the receiving device before coupling or decoupling of the output of the rectifier to the reference voltage through the dissipating element.

In a second implementation form of the receiving device, according to the first aspect as such or any preceding implementation of the first aspect, the transmission at the first duration corresponds to a light-load condition or a no-load condition at the receiving device.

In a third implementation form of the receiving device, according to the first aspect as such or any preceding implementation of the first aspect, the light-load condition corresponds to a less than 50 milliamp current draw at the dissipating element.

In a fourth implementation form of the receiving device, according to the first aspect as such or any preceding implementation of the first aspect, the first duration extends to about 1-10 milliseconds before the start of the transmission of the packet and 1-10 milliseconds after the end of the transmission of the packet.

In a fifth implementation form of the receiving device, according to the first aspect as such or any preceding implementation of the first aspect, the second duration excludes about 1-10 milliseconds before the end of the transmission of the packet and 1-10 milliseconds after the start of the transmission of the next packet.

In a sixth implementation form of the receiving device, according to the first aspect as such or any preceding implementation of the first aspect, the transmission at the first duration corresponds to a communication based on amplitude modulation.

In a seventh implementation form of the receiving device, according to the first aspect as such or any preceding implementation of the first aspect, the receiving device is a semiconductor package.

In an eight implementation form of the receiving device, according to the first aspect as such or any preceding implementation of the first aspect, the receiving device is a mobile device, a tablet, a cellular phone, a wearable communications device, a digital pen, a wireless headphone, a toothbrush, or an internet of things (IOT) device.

A second aspect relates to a method that includes: (1) receiving, by a transistor in a device, a first control signal for a first duration corresponding to a transmission of a packet by the device, (2) electrically coupling, by the transistor, an output of a rectifier of the device through a dissipating element to a reference voltage in response to receiving the first control signal, (3) receiving, by the transistor, a second control signal at a second duration corresponding from an end of the transmission of the packet to a transmission of a next packet by the device, and (4) decoupling, by the transistor, the output of the rectifier from the reference voltage in response to receiving the second control signal at the transistor.

In a first implementation form of the method according to the second aspect, the method additionally includes determining that a light-load condition or a no-load condition is present at the device before the coupling or decoupling of the output of the rectifier to the reference voltage through the dissipating element.

In a second implementation form of the method, according to the second aspect as such or any preceding implementation of the second aspect, the transmission at the first duration corresponds to a light-load condition or a no-load condition at the device.

In a third implementation form of the method, according to the second aspect as such or any preceding implementation of the second aspect, the light-load condition corresponds to a less than 50 milliamp current draw at the dissipating element.

In a fourth implementation form of the method, according to the second aspect as such or any preceding implementation of the second aspect, the first duration extends to about 1-10 milliseconds before the transmission of the packet and 1-10 milliseconds after a duration of the transmission of the packet.

In a fifth implementation form of the method, according to the second aspect as such or any preceding implementation of the second aspect, the second duration excludes about 1-10 milliseconds before the transmission of the packet and 1-10 milliseconds after a duration of the transmission of the packet.

In a sixth implementation form of the method, according to the second aspect as such or any preceding implementation of the second aspect, the transmission at the first duration corresponds to a communication based on an amplitude-shift keying (ASK) modulation.

A third aspect relates to a device that includes a rectifier configured to operate in a first state and a second state. In the first state, a current load path is enabled for a duration corresponding to a transmission of a packet by the device, and an output of the rectifier is coupled to a reference voltage through a resistor along the current load path. In the second state, the current load path is disabled for a duration corresponding from an end of the transmission of the packet to a transmission of a next packet by the device.

In a first implementation form of the device according to the third aspect, the device includes a switch electrically coupled to the resistor, the switch is configured to (1) enable the current load path in the first state, and (2) disable the current load path in the second state.

In a second implementation form of the device, according to the third aspect as such or any preceding implementation of the third aspect, the transmission of the packet corresponds to the device being in a light-load condition or a no-load condition.

In a third implementation form of the device, according to the third aspect as such or any preceding implementation of the third aspect, the resistor is configured to (1) provide a minimum load at the output of the rectifier for the duration corresponding to a transmission of the packet, and (2) provide an open load for the duration corresponding from the end of the transmission of the packet to the transmission of the next packet by the device.

Embodiments can be implemented in hardware, software, or in any combination thereof.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 5A-B are schematics of embodiment dummy circuits of the receiving device;

FIGS. 6A-B are schematics of an embodiment dissipating element;

FIG. 7 is a timing diagram of an embodiment ASK packet transmission and corresponding control signal provided to the dummy circuit at light-load or no-load conditions at the receiving device.

DETAILED DESCRIPTION OF ILLUSTRATIVE EMBODIMENTS

Figure 1:
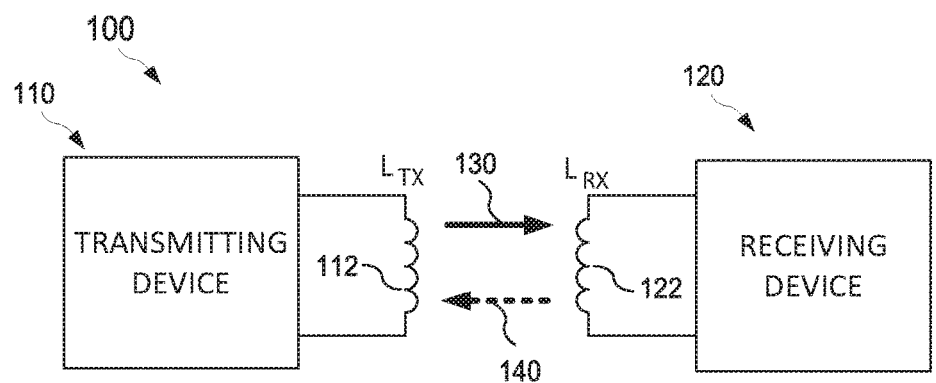
FIG. 1 is a diagram of an embodiment wireless power system.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims.

While the inventive aspects are described primarily in the context of a wireless power system using amplitude-shift keying (ASK) modulation, it should also be appreciated that these inventive aspects may also be applicable to any other type of amplitude modulation (AM) scheme. Further, embodiments of the present invention may operate without complying with the Qi standard.

As noted, a receiving device may use ASK modulation to communicate with a transmitting device in a wireless power system. Thus, the receiving device can use ASK modulation to, for example, request a power transfer adjustment from the transmitting device. A receiving device may include a dissipating element (e.g., dummy load, dummy resistive load, etc.) at the output of a rectifier of the receiving device, which can be electrically coupled to a reference voltage using a controllable switch. A minimum current draw at the output of the rectifier is generated when the dissipating element is electrically coupled to the reference voltage.

In embodiments, the performance of the ASK modulation is improved when the rectifier draws a minimum current draw. The minimum current draw is particularly advantageous in light-load or no-load conditions. Without the inclusion of the dissipating element, during the light-load or no-load conditions, the current draw from the rectifier is near zero. The near-zero current draw decreases the signal-to-noise ratio of the ASK modulation, and the communication between the receiving device and the transmitting device is negatively impacted.

A disadvantage, however, in the use of the dissipating element during the light-load or no-load condition is that the receiving device continues to dissipate power even when no ASK packet is being transmitted from the receiving device to the transmitting device.

Thus, a need exists for an improved system and method to overcome these and other limitations in the existing solutions to provide a reliable ASK modulation packet transmission in a light-load or no-load condition while improving the efficiency and decreasing waste and unwanted heat generated by the dissipating element at the receiving device.

Embodiments of this disclosure provide a system and method for enhancing ASK packet transfer reliability and increasing power dissipation efficiency at light-load or no-load conditions in the receiving device. In embodiments, the receiving device includes a dummy circuit coupled to a rectifier. The dummy circuit consists essentially of a switch and a dissipating element electrically coupled to a reference voltage. During a first duration corresponding to a transmission of an ASK packet, the output of the rectifier is electrically coupled to the reference voltage through the dissipating element. And, during a second duration corresponding to the end of the transmission of the ASK packet, the output of the rectifier is disconnected from the reference voltage.

In embodiments, the first duration corresponds to a total period of about 1 to 10 milliseconds before the transmission of the ASK packet, the period of the transmission of the ASK packet, and about 1 to 10 milliseconds after the transmission of the ASK packet. The second duration corresponds to a period from about 1 to 10 milliseconds after the completion of the transmission of the ASK packet and extends until 1 to 10 milliseconds before the transfer of the next ASK packet.

In some embodiments, the dissipating element draws about 30 to 50 milliamps of current from a rectifier that provides about 6 to 9 Volts. In a system where the dissipating element is continuously drawing current, the loss of power at the receiving device is about 180 to 450 milliwatts. The embodiments of this disclosure advantageously provide about 85 to 90 percent improved power dissipation efficiency because the dissipating element provides a minimum load generated in the form of wasted energy (e.g., heat) only during a period substantially corresponding to the transmission of ASK packets and prevents waste at other periods. Thus, the energy waste at the receiving device through the dissipating element during a light-load or no-load condition is significantly improved.

Further, the heat generated in the receiver device due to the continuously enabled condition of the power dissipation through the dissipating element is advantageously minimized, which results in further improved ASK modulation signal-to-noise ratio, enhanced device life, and faster charging. These and other details are discussed in greater detail below.

FIG. 1 illustrates an embodiment wireless power system 100. The wireless power system 100 may also be referred to as a wireless charging system. The wireless power system 100 includes a transmitting device 110 and a receiving device 120. The transmitting device 110 generates and transmits wireless energy 130 to the receiving device 120.

The transmitting device 110 may be a base station, for example, a charging pad, which provides inductive power to the receiving device 120. The receiving device 120 may be, for example, a mobile device, a tablet, a cellular phone, a wearable communications device (e.g., a smartwatch), a digital pen, a wireless headphone, a toothbrush, internet of things (IOT) device, or other such devices. The receiving device 120 is, essentially, the consumer of the inductive power.

The transmitting device 110 includes transmitter coils 112 ($L_{TX}$). The receiving device 120 includes receiver coils 122 ($L_{RX}$). Each coil, or winding, may be a loop antenna or a magnetic antenna. The coils may have a physical core (e.g., ferrite core) or an air core. The coils may be implemented as an antenna strip or using a Litz wire. The resonant frequency of each coil is based on the shape and size of the looping wire or coil. In some embodiments, additional capacitance and inductance may be added to each coil to create a resonant structure at the desired resonant operating frequency.

In embodiments, the wireless energy 130 is transmitted from the transmitting device 110 to the receiving device 120 using resonant inductive coupling between the transmitter coils 112 and the receiver coils 122. The receiving device 120 may use the power to charge rechargeable batteries or to power the components within the receiving device 120 directly.

Several interface standards have been developed to standardize wireless power transfer and related functions. One such interface standard is Qi, which is promoted by the Wireless Power Consortium (WPC). Qi and other similar standardized protocols may be used to define the communication interface for controlling the power transfer in the wireless power system 100. For instance, the receiving device 120 may request, from the transmitting device 110, a change (e.g., an increase, a decrease, a pause, etc.) related to the transferred wireless energy 130.

Figure 2:
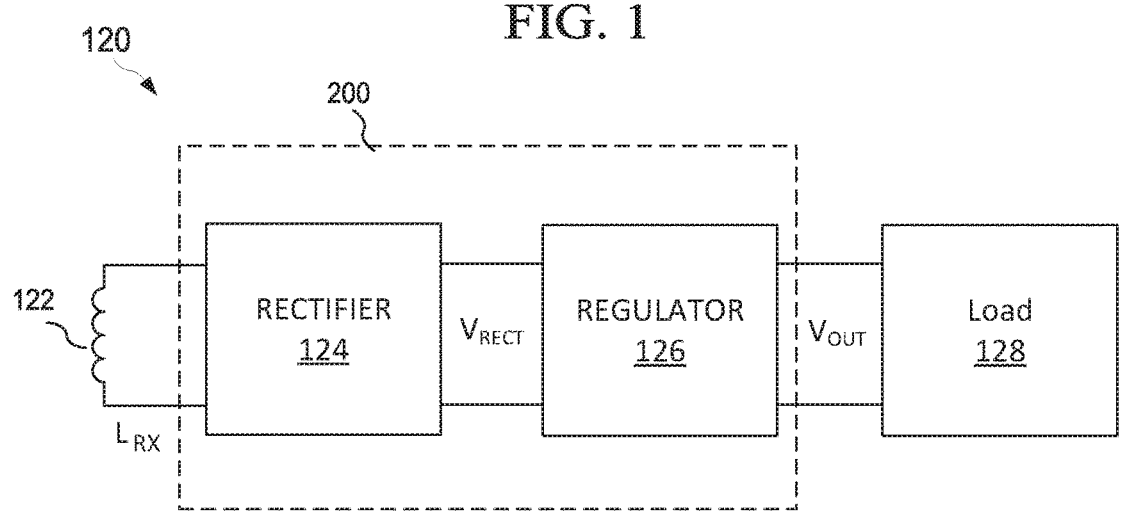
FIG. 2 is a diagram of an embodiment receiving device.

FIG. 2 illustrates an embodiment receiving device 120. As shown, the receiving device 120 includes the receiver coils 122, a power charging circuit 200, and a load 128. The power charging circuit 200 consists essentially of a rectifier 124 and a regulator 126. The receiving device 120 may include additional components not depicted in FIG. 2, such as long-term storage (e.g., non-volatile memory, etc.), a non-transitory computer-readable medium, one or more antenna elements, drivers, demodulators, modulators, filter circuits, and impedance matching circuits.

The rectifier 124 converts the alternating current (AC) voltage, at the receiver coils 122, to a direct current (DC) voltage. The rectifier 124 may be any type of rectifier, such as a low-impedance synchronous rectifier having full-wave or half-wave rectification, or an active rectifier. In embodiments, the rectifier 124 may be a bridge rectifier; however, other types of rectifiers are also contemplated.

The regulator 126 receives a voltage ($V_{RECT}$) from the rectifier 124 and then regulates that voltage to maintain a constant output voltage ($V_{OUT}$) at the load 128. The regulator 126 may be any type of voltage regulator, such as a linear regulator (e.g., low drop-out (LDO) linear regulator). In some embodiments, the rectifier 124 and the regulator 126 may be part of a switched-mode power supply (SMPS) circuit.

The load 128 is the primary benefactor of the transferred wireless energy 130. The load 128 may be a charge storage device, such as a battery. For instance, the load 128 may be a battery of a cellular phone or a smartwatch. As an example, the transmitting device 110 may be a charging pad, and a smartwatch may be placed on the charging pad. The charging pad transfers wireless power to the battery of the smartwatch without the need for interconnecting cables between the two devices.

Figure 3A:
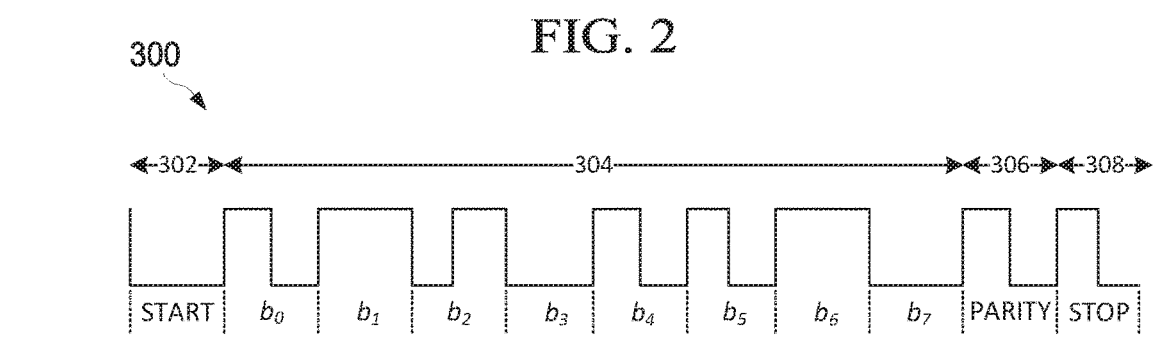
FIG. 3A is a diagram of an embodiment amplitude-shift keying (ASK) modulation message byte format for messages exchanged using ASK modulation.
Figure 3B:
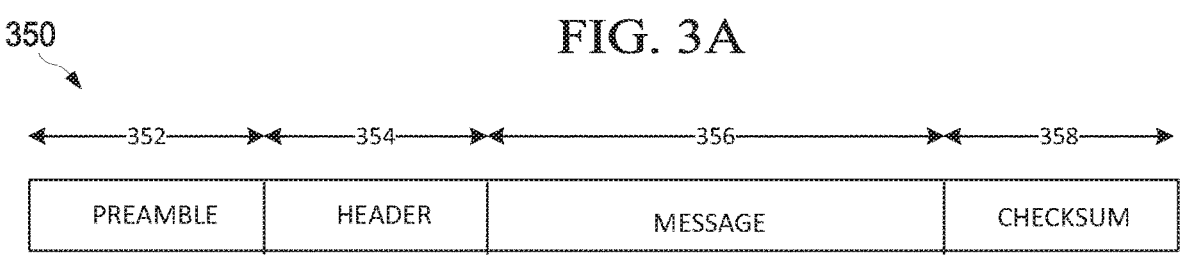
FIG. 3B is a diagram of an embodiment ASK packet format for messages exchanged using ASK modulation.

FIGS. 3A-B illustrate, respectively, an exemplary ASK message byte 300 and an exemplary ASK packet 350. As previously noted, the receiving device 120 can transmit identification and control data to the transmitting device 110 to, for example, adjust power requirements and to control the transferred wireless energy 130. The Qi standard provides a unidirectional communication protocol from the receiving device 120 to the transmitting device 110 using an in-band (e.g., Qi) communication path. In-band communication refers to signaling over the power path at the same frequency as the power transfer. In embodiments, an amplitude modulation scheme, such as ASK modulation, may be used.

ASK modulation refers to a modulation scheme in which digital data is represented as variations in the amplitude of a carrier wave. In ASK modulation, a binary symbol "1" is represented by transmitting a fixed-amplitude carrier wave at a fixed frequency for a bit duration of T seconds. As an example, for a signal value of "1," the carrier signal is transmitted; otherwise, the signal value corresponds to a signal value of "0."

Generally, a digital modulation scheme represents digital data using a finite number of distinct signals. The ASK modulation scheme uses a limited number of amplitudes, where each amplitude is assigned a unique pattern of binary digits.

As shown in FIG. 3A, an ASK message byte 300 includes ii bits: (1) a start bit 302, (2) 8 information bits 304, (3) a parity bit 306, and (4) a stop bit 308. In turn, the ASK message byte 300 is transmitted in an ASK packet 350.

The ASK packet 350 includes (1) a preamble 352, (2) a header 354, (3) a message 356, and (4) a checksum 358. The preamble 352 is used for synchronization with the incoming data; the header 354 determines the packet type, the message 356 carries the payload (i.e., ASK message byte 300 carrying the information of the packet); and, finally, the checksum 358 is used to verify data integrity of the transmission.

The ASK packet 350 is transmitted using ASK modulation by, for example, switching a capacitive or resistive load on the receiving device 120. In embodiments, a processor in the receiving device 120 controls the generating and the transmission of the ASK packet 350—discussed in further detail below.

Figure 4:
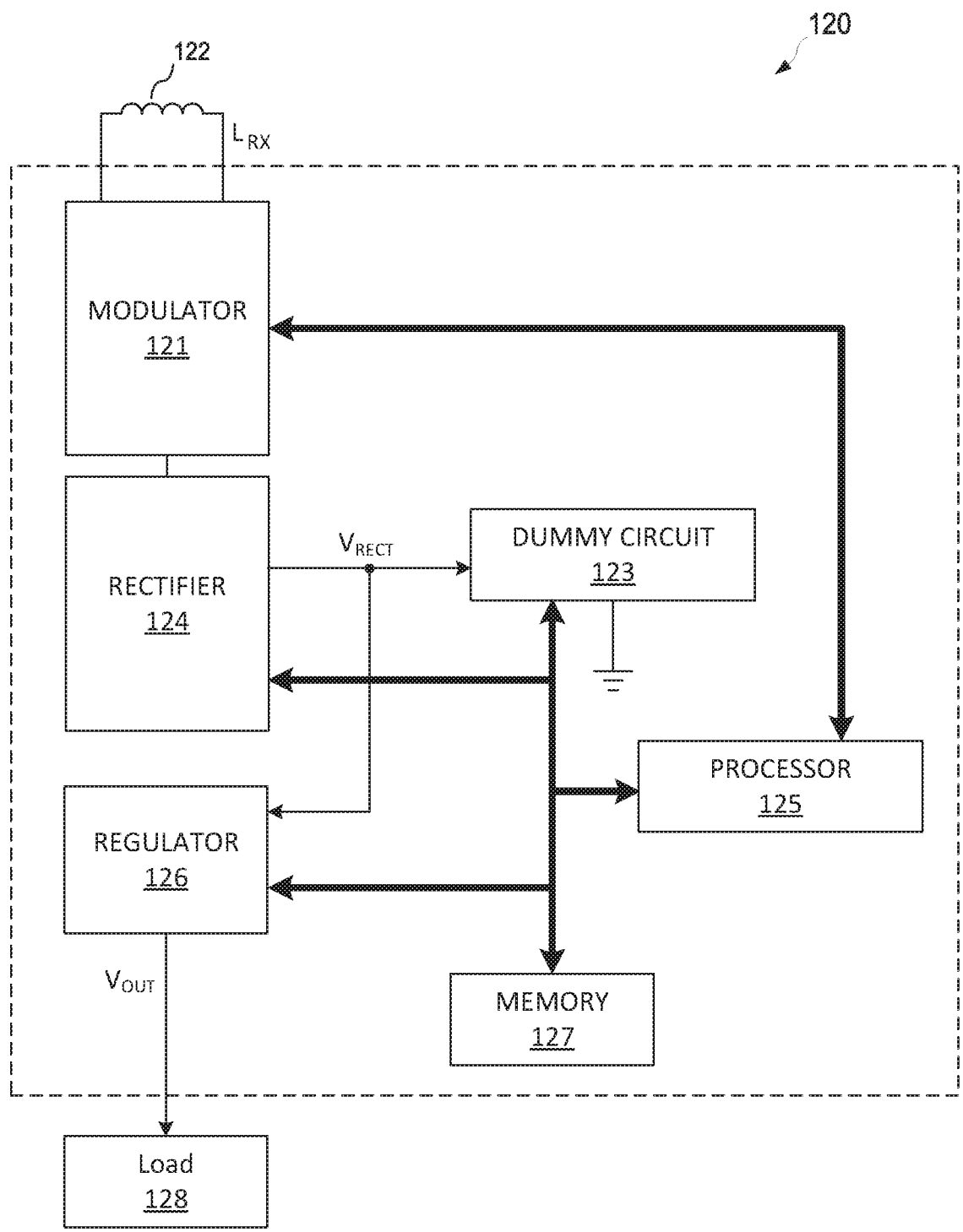
FIG. 4 is a diagram of an embodiment receiving device.

FIG. 4 illustrates a more detailed diagram of the embodiment receiving device 120. The receiving device 120, in addition to the components previously discussed in FIG. 2, includes a modulator circuit 121, a dummy circuit 123, a processor 125, and a memory 127, which may (or may not) be arranged as shown in FIG. 4.

The processor 125 can be, for example, a microprocessor, a microcontroller, a digital signal processor, a field-programmable gate array (FPGA), or an application-specific integrated circuit (ASIC). The receiving device 120 is shown to have a single processor; however, in some embodiments, multiple processors may be included, and the various functions herein attributed to the processor 125 may be distributed across these multiple processors.

The memory 127 may be configured to store data, programs, firmware, operating systems, and other information and to make the data, programs, firmware, operating systems, and additional information accessible to the processor 125. The memory 127 may include any type of non-transitory system memory such as static random access memory (SRAM), dynamic random access memory (DRAM), synchronous DRAM (SDRAM), read-only memory (ROM), or a combination thereof. In an embodiment, the memory 127 may include ROM for use at boot-up, and DRAM for program, firmware, and data storage for use while executing programs. The memory 127 may include, for example, one or more of a solid-state drive, hard disk drive, a magnetic disk drive, a removable memory drive, or an optical disk drive.

The modulator circuit 121 is configured to provide the amplitude modulation for the receiving device 120. The processor 125 controls the amplitude and pulse-width of the ASK modulation of the receiving device 120 through the modulator circuit 121.

The dummy circuit 123 includes a dissipating element arranged to be electrically coupled to a reference voltage through a switch of the dummy circuit 123. The reference voltage having a potential that provides a current load path from the rectifier 124 towards the dummy circuit 123. In embodiments, the reference voltage is a reference ground. In various embodiments, the processor 125 is configured to electrically couple the output of the rectifier to the reference voltage through the dissipating element based on certain conditions present at the receiving device 120. In a default configuration, however, the output of the rectifier is disconnected from the reference voltage. Thus, instructions stored, for example, in the memory 127, when executed by the processor 125, provide a control signal to the dummy circuit 123 to electrically couple or disconnect the output of the rectifier to a reference voltage through the dummy circuit 123. The details of the dummy circuit 123 and various exemplary circuit configurations are provided in discussions concerning FIGS. 5A-B.

In an embodiment, at light-load or no-load conditions, to improve the performance of the in-band communication, the dummy circuit 123 is enabled using a control signal from the processor 125 to the dummy circuit 123. The enabling of the dummy circuit 123 in the receiving device 120 enhances ASK modulation, which in turn results in a quicker power transfer and communication transactions with the transmitting device 110. The dummy circuit 123, when enabled, improves the modulation index as a function of the load. The improvement is especially advantageous during reduced magnetic coupling between the receiver coils 122 of the receiving device 120 and the transmitter coils 112 of the transmitting device 110.

In embodiments, under light-load or no-load conditions, the dummy circuit 123 draws a minimum current from the rectifier 124. Thus, the dummy circuit 123 ensures a minimal current flow through a dissipating element that increases the signal-to-noise ratio (SNR) during the light-load or no-load condition. The increased signal-to-noise ratio decreases oscillations at the modulation circuit 121 during ASK modulation data transmission.

In embodiments, the dummy circuit 123, at the light-load condition and when enabled, draws a maximum of 50 milliamps of current through the rectifier 124. The light-load or no-load condition may occur in a variety of situations. As an example, the receiving device 120 may itself be a light-load device (e.g., wireless earbuds, wireless earbud charger, smartpen, etc.), which draws small amounts of power for charging or operation. In another example, the receiving device 120 may have reached full charging capacity, and to improve, for example, system efficiency and battery life, the receiving device 120 drops the current draw, which results in the light-load condition. In yet another case, the receiving device 120 may have reached an overheating condition and temporarily halts or minimizes the power transfer, which again results in the light-load condition at the receiving device 120. In some embodiments, the processor 125 determines that the receiving device 120 is operating in a light-load or no-load condition.

Regardless as to why the wireless power system is placed in a light-load or no-load condition, without a minimum load, the ASK modulation may become unstable and, thus, unreliable.

FIGS. 5A-B illustrate diagrams of embodiments of an exemplary dummy circuit 123. In each diagram, the dummy circuit 123 includes, at a minimum, a switch 502 and a dissipating element 504. The switch 502 electrically couples or disconnects the dissipating element 504 from the output of the rectifier 124 to the reference voltage based on a control signal ($V_{CONT}$). The output of the rectifier 124 is the rectified voltage that is additionally coupled as an input to the regulator 126.

In some embodiments, the dissipating element 504 may be one or more resistive loads. In embodiments, the dissipating element 504 may include multiple resistive loads arranged in a series and/or parallel configurations to each other. In embodiments, the dissipating element 504 may include one or more additional active devices that enable all or several resistive loads. In some embodiments, the dissipating element 504 may be formed as one or more discrete components. In other embodiments, the dissipating element 504 may be formed in one or more integrated circuits (ICs).

The switch 502 operates in either an open or closed position based on a control signal ($V_{CONT}$) from, for example, the processor 125. The switch 502 can be but is not limited to, a field-effect-transistor (FET) or a bipolar junction transistor (BJT). A FET can be a metal-oxide-semiconductor FET (MOSFET), a junction FET (JFET), an insulated-gate bipolar transistor (IGBT), or any other semiconductor device used as a switch. The FET device may be a negative-type or a positive-type FET. For instance, the switch 502 may be an n-MOSFET, p-MOSFET, or the like.

In embodiments, the switch 502 may be an active device, and the switch 502 may be biased using the control signal ($V_{CONT}$) to regulate the current flow that is sinking to the ground. Thus, the maximum current flow through the switch 502 may be regulated to limit the amount of current dissipated at the dissipating element 504.

In FIG. 5A, the dissipating element 504 has a first terminal electrically coupled to a first terminal of the switch 502 and a second terminal electrically coupled to the reference voltage. Further, the switch 502 has a second terminal electrically coupled to the output of the rectifier 124.

In FIG. 5B, the switch 502 has a first terminal electrically coupled to a first terminal of the dissipating element 504 and a second terminal electrically coupled to the reference voltage. Moreover, the dissipating element 504 has a second terminal electrically coupled to the output of the rectifier 124.

In both cases, when the switch 502 is in the open position, the dissipating element 504 is disconnected from the rectifier 124. And, when the switch 502 is in the closed position, the dissipating element 504 draws current from the output of the rectifier 124 and provides a minimum load during, for example, ASK packet transfer at the light-load or no-load condition.

In an embodiment, the current draw from the dissipating element 504 is between 30 to 50 milliamps during the light-load or no-load condition. In an exemplary case, with an output voltage from the rectifier being between 6 to 9 Volts, the power dissipated through the dissipating element 504 is between 180 to 450 milliwatts.

The power dissipated through the dissipating element 504 is present in the form of heat within the receiving device 120. The additional heat generated by the dissipating element 504 may result in an overheating condition or a slowdown in the charging of the receiving device 120. Embodiments of this disclosure provide a solution to minimize the duration of the power dissipation at light-load or no-load conditions.

FIGS. 6A-B illustrate schematics of an embodiment dissipating element 504. As shown, FIGS. 6A-B includes n number of resistors 602a, 602b, . . . , and 602n, respectively, arranged in series and parallel. The value n can be any integer greater than 1. Thus although in FIGS. 6A-B multiple resistors are shown, a dissipating element having a single resistor is also contemplated.

Furthermore, the dissipating element 504 shown in FIGS. 6A and 6B are non-limiting, may (or may not) be arranged as shown, and other series and parallel combinations of resistors are also contemplated. Moreover, the dissipating element 504 may include additional components not depicted, such as transistors, capacitors, or inductors.

In general terms, the dissipating element 504 provides a minimum load at the output of the rectifier when electrically coupled between the reference voltage and the output of the rectifier. In such a configuration, a current load path from the output of the rectifier through the dissipating element 504 to the potential reference is enabled. In contrast, when the current load path is disabled, no minimum load is provided by the dissipating element at the output of the rectifier.

FIG. 7 illustrates timing diagrams for embodiments of ASK packet transmissions 700 and the corresponding enabling of the dummy circuit 720. The horizontal axis displays the passage of time in milliseconds. Typically, an ASK packet transmission duration 701 and 705 is about 30 milliseconds, and the period between the ASK packet transmission duration 703 is about 250 milliseconds.

Embodiments of this disclosure provide a reliable system and method that enables the dummy circuit 123 to be enabled during each ASK packet transmission duration 701 and 705.

In embodiments, the dummy circuit 123 is enabled for a total period of about 1-10 milliseconds before the ASK packet transmission duration 701 and 705, during the ASK packet transmission duration 701 and 705, and about 1-10 milliseconds after the ASK packet transmission duration 701 and 705. The total period during which the dummy circuit 123 is enabled is shown using the dummy circuit enable durations 721 and 725. At other times, the dummy circuit 123 is disabled, which is shown as the dummy circuit disable duration 723.

The dummy circuit 123, thus, is enabled for durations 721 and 725, which each corresponds to between about 32 milliseconds (i.e., 1 millisecond before, 30 millisecond ASK packet transmission, and 1 millisecond after) on the low-end up to about 50 milliseconds (i.e., 10 milliseconds before, 30 milliseconds ASK packet transmission, and 10 milliseconds after) at the high-end.

The enabling of the dummy circuit 123 principally during the ASK packet transmission duration 701 and 705 and disabling of the dummy circuit 123 principally between the ASK packet transmission duration 703, significantly address unnecessary power dissipation in the receiving device 120 through the dissipating element 504.

As the minimum load for the ASK modulation is needed during the ASK packet transmission, the enabling of the dummy circuit 123 at other times is equivalent to unnecessary loss and heat in the receiving device 120. Thus, the receiving device minimizes the 180 to 450 milliwatts power dissipation to about 32 to 50 milliseconds during a 300 millisecond period, which is about 85 to 90% improvement in efficiency during the light-load and no-load conditions.

Figure 8:
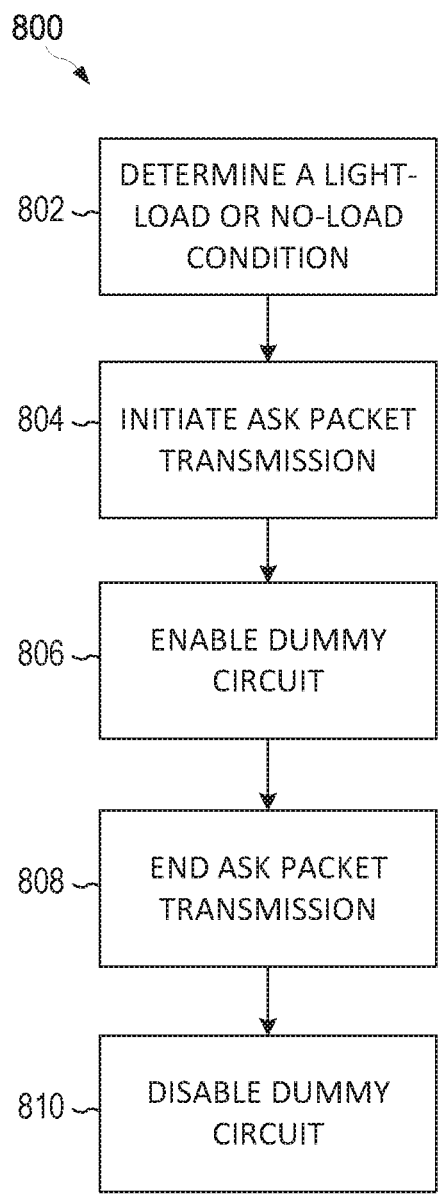
FIG. 8 is a flowchart of an embodiment method of operating the receiving device.

FIG. 8 illustrates a flowchart of an embodiment method 800 for enabling and disabling the dummy circuit 123 during a light-load or no-load ASK packet transmission, as may be performed by the receiving device 120. At step 802, the processor 125 determines that the receiving device 120 is in a light-load or a no-load condition. The processor 125 is additionally in communication with the modulator circuit 121. At step 804, the processor 125 determines that the receiving device 120 is to initiate a transmission of an ASK packet using the modulator circuit 121. At step 806, the processor 125 provides an enabling control signal to the switch 502 in the dummy circuit 123. The enabling control signal is sent to the switch 502 about 1-10 milliseconds before the ASK packet is transmitted from the receiving device. The switch, when enabled, electrically couples the output of the rectifier 124 to the reference voltage through the dissipating element 504. The enabling of the dummy circuit 123 provides a minimal load for the receiving device during ASK packet transmissions in the light-load or no-load conditions.

At step 808, the processor 125 determines that the ASK packet transmission is ending, and provides a disabling control signal to the switch 502 in the dummy circuit 123. The disabling control signal is sent to the switch 502 about 1-10 milliseconds after the ASK packet transmission has ended. The dummy circuit 123 remains disabled until the processor 125, repeats the process at step 804 under the light-load or no-load condition corresponding to the ASK packet transmission.

It is noted that the order of steps shown in FIG. 8 is not absolutely required, so in principle, the various steps may be performed out of the illustrated order. Also, certain steps may be skipped, different steps may be added or substituted, or selected steps or groups of steps may be performed in a separate application.

In the present description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., it is referred to the orientation of the drawings. Unless otherwise specified, the terms "approximately," "substantially," "about," and "in the order of" are used herein to designate a tolerance of plus or minus 10%, preferably of plus or minus 5%, of the value in question.

Unless otherwise specified, when reference is made to two elements electrically connected together, this means that the elements are directly connected with no intermediate element other than conductors. When reference is made to two elements electrically coupled together, this means that the two elements may be directly coupled (connected) or coupled via one or a plurality of other elements.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A receiving device comprising:
   a rectifier;
   a dissipating element coupled to an output of the rectifier;
   a transistor coupled to the dissipating element;
   a non-transitory memory storage comprising instructions; and
   a processor in communication with the non-transitory memory storage and coupled to the transistor, wherein the processor executes the instructions to:
      electrically couple, by the transistor, the output of the rectifier through the dissipating element to a reference voltage for a first duration corresponding to a transmission of a packet by the receiving device, and
      decouple, by the transistor, the output of the rectifier from the reference voltage for a second duration corresponding from an end of the transmission of the packet to a transmission of a next packet by the receiving device.

2. The receiving device of claim 1, wherein the processor executes the instructions to determine that a light-load condition or a no-load condition is present at the receiving device before coupling or decoupling of the output of the rectifier to the reference voltage through the dissipating element.

3. The receiving device of claim 1, wherein the transmission at the first duration corresponds to a light-load condition or a no-load condition at the receiving device.

4. The receiving device of claim 3, wherein the light-load condition corresponds to a less than 50 milliamp current draw at the dissipating element.

5. The receiving device of claim 1, wherein the first duration extends to about 1-10 milliseconds before the start of the transmission of the packet and 1-10 milliseconds after the end of the transmission of the packet.

6. The receiving device of claim 1, wherein the second duration excludes about 1-10 milliseconds before the end of the transmission of the packet and 1-10 milliseconds after the start of the transmission of the next packet.

7. The receiving device of claim 1, wherein the transmission at the first duration corresponds to a communication based on amplitude modulation.

8. The receiving device of claim 1, wherein the receiving device is a semiconductor package.

9. The receiving device of claim 1, wherein the receiving device is a mobile device, a tablet, a cellular phone, a wearable communications device, a digital pen, a wireless headphone, a toothbrush, or an internet of things (IOT) device.

10. A method comprising:
    receiving, by a transistor in a device, a first control signal for a first duration corresponding to a transmission of a packet by the device;
    electrically coupling, by the transistor, an output of a rectifier of the device through a dissipating element to a reference voltage in response to receiving the first control signal;
    receiving, by the transistor, a second control signal at a second duration corresponding from an end of the transmission of the packet to a transmission of a next packet by the device; and
    decoupling, by the transistor, the output of the rectifier from the reference voltage in response to receiving the second control signal at the transistor.

11. The method of claim 10, further comprising determining that a light-load condition or a no-load condition is present at the device before the coupling or decoupling of the output of the rectifier to the reference voltage through the dissipating element.

12. The method of claim 10, wherein the transmission at the first duration corresponds to a light-load condition or a no-load condition at the device.

13. The method of claim 12, wherein the light-load condition corresponds to a less than 50 milliamp current draw at the dissipating element.

14. The method of claim 10, wherein the first duration extends to about 1-10 milliseconds before the transmission of the packet and 1-10 milliseconds after a duration of the transmission of the packet.

15. The method of claim 10, wherein the second duration excludes about 1-10 milliseconds before the transmission of the packet and 1-10 milliseconds after a duration of the transmission of the packet.

16. The method of claim 10, wherein the transmission at the first duration corresponds to a communication based on an amplitude-shift keying (ASK) modulation.

17. A device comprising:
    a rectifier configured to operate in a first state and a second state, wherein in the first state, a current load path is enabled for a duration corresponding to a transmission of a packet by the device and an output of the rectifier is coupled to a reference voltage through a resistor along the current load path, and wherein in the second state, the current load path is disabled for a duration corresponding from an end of the transmission of the packet to a transmission of a next packet by the device.

18. The device of claim 17, wherein the device comprises a switch electrically coupled to the resistor, the switch configured to:
enable the current load path in the first state; and
disable the current load path in the second state.

19. The device of claim 18, wherein the transmission of the packet corresponds to the device being in a light-load condition or a no-load condition.

20. The device of claim 17, the resistor is configured to:
provide a minimum load at the output of the rectifier for the duration corresponding to a transmission of the packet; and
provide an open load for the duration corresponding from the end of the transmission of the packet to the transmission of the next packet by the device.

* * * * *